US008239608B1

(12) United States Patent
Ginzton (10) Patent No.: US 8,239,608 B1
(45) Date of Patent: Aug. 7, 2012

(54) SECURE COMPUTING ENVIRONMENT (75) Inventor: Matt Ginzton, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1389 days.

(21) Appl. No.: 11/544,999

(22) Filed: Oct. 5, 2006

(51) Int. Cl.
*G06F 12/00* (2006.01)
*G06F 9/46* (2006.01)
*G06F 7/04* (2006.01)
(52) U.S. Cl. .................................... 711/6; 718/1; 726/2
(58) Field of Classification Search .................. 711/162, 711/6; 726/2
See application file for complete search history.

(56) References Cited

U.S. PATENT DOCUMENTS

| | | | |
|---|---|---|---|
| 7,617,530 B2 * | 11/2009 | Ruzyski et al. | 726/21 |
| 2002/0143842 A1 * | 10/2002 | Cota-Robles et al. | 709/1 |
| 2003/0140210 A1 * | 7/2003 | Testardi | 711/203 |
| 2005/0076324 A1 * | 4/2005 | Lowell et al. | 717/100 |
| 2007/0234356 A1 * | 10/2007 | Martins et al. | 718/1 |

* cited by examiner

*Primary Examiner* — Yaima Campos
*Assistant Examiner* — Hamdy S Ahmed

(57) ABSTRACT

Detailed herein are approaches to enabling a secure computing environment. In one approach, a computer system runs an operating system and a virtual machine management console. An input device is used to provide input to the operating system. The operating system is configured such that input received from the input device is directed to the virtual machine management console. The virtual machine management console, in turn, is configured to pass some or all of the input to a virtual machine.

19 Claims, 7 Drawing Sheets

Computing Environment
4000

Flowchart 5000

FIG. 5

Flowchart 6000

FIG. 6

Flowchart 7000

FIG. 7

SECURE COMPUTING ENVIRONMENT

BACKGROUND

1. Field of the Invention

Embodiments of the present invention pertain to virtual machines.

2. Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

Figure 1:
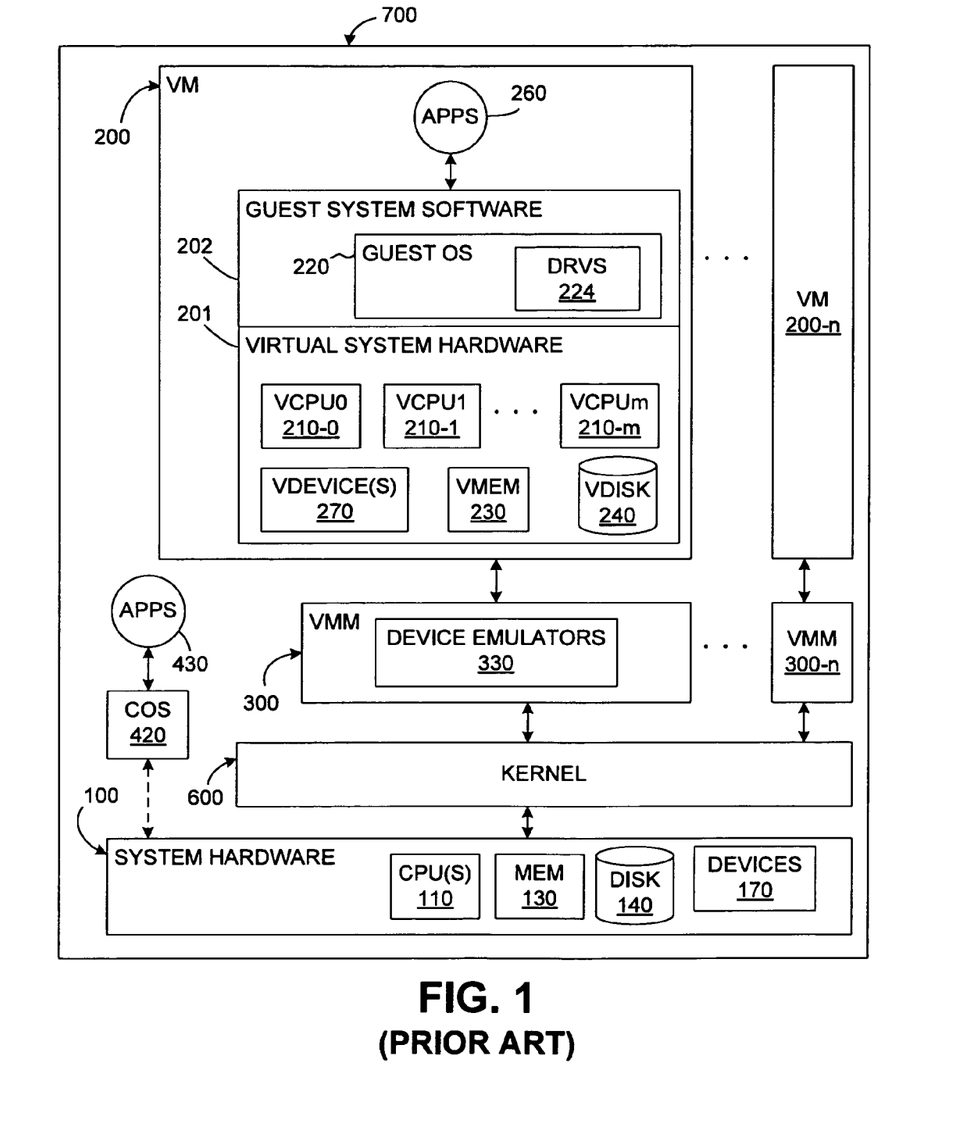
FIG. 1 is a diagram of an exemplary virtualized computer system with which embodiments of the present technology may be practiced.

As is well known in the field of computer science, a virtual machine (VM) is an abstraction—a "virtualization"—of an actual physical computer system. FIG. 1 shows one possible, arrangement of a computer system 700 that implements virtualization. A virtual machine (VM) or "guest" 200 is installed on a "host platform," or simply "host," which will include system hardware, that is, a hardware platform 100 of computer system 700, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170. Additionally, an operating system, such as Commercial Operating System 420, and hosted application(s) 430, is shown with an optional coupling to system hardware 100.

Each VM 200 will typically have both virtual system hardware 201 and guest system software 202. The virtual system hardware typically includes at least one virtual CPU 210, virtual memory 230, at least one virtual disk 240, and one or more virtual devices 270. Note that a disk—virtual or physical—is also a "device," but is usually considered separately because of the important role of the disk. All of the virtual hardware components of the VM 200 may be implemented in software using known techniques to emulate the corresponding physical components. The guest system software 202 includes a guest operating system (OS) 220 and drivers 224 as needed for the various virtual devices 270.

Note that a single VM 200 may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, . . . , 210-m (VCPU0, VCPU1, . . . , VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc.

If the VM 200 is properly designed, applications 260 running on the VM 200 will function as they would if run on a "real" computer, even though the applications are running at least partially indirectly, that is via the guest OS 220 and virtual processor(s) 210-0, 210-1, . . . , 210-m. Executable files will be accessed by the guest OS 220 from the virtual disk 240 or virtual memory 230, which will be portions of the actual physical disk 140 or memory 130 allocated to that VM. Once an application 260 is installed within the VM 200, the guest OS 220 retrieves files from the virtual disk 240 just as if the files had been pre-stored as the result of a conventional installation of the application 260. The design and operation of virtual machines, such as VM 200, are well known in the field of computer science.

Some interface is generally required between the guest software within a VM 200 and the various hardware components and devices in the underlying hardware platform 100. This interface—which may be referred to generally as "virtualization software"—may include one or more software components and/or layers, possibly including one or more of the software components known in the field of virtual machine technology as "virtual machine monitors" (VMMs) 300, . . . , 300-n, "hypervisors," or virtualization "kernels" 600. Because virtualization terminology has evolved over time and has not yet become fully standardized, these terms do not always provide clear distinctions between the software layers and components to which they refer. For example, "hypervisor" is often used to describe both a VMM 300 and a kernel 600 together, either as separate but cooperating components or with one or more VMMs 300, . . . , 300-m incorporated wholly or partially into the kernel 600 itself; however, "hypervisor" is sometimes used instead to mean some variant of a VMM 300 alone, which interfaces with some other software layer(s) or component(s) to support the virtualization. Moreover, in some systems, some virtualization code is included in at least one "superior" VM 200 to facilitate the operations of other VMs. Furthermore, specific software support for VMs 200, . . . , 200-n may be included in the host OS itself.

Moreover, FIG. 1 shows virtual machine monitors 300, . . . , 300-n that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut.

The various virtualized hardware components in the VM, such as the virtual CPU(s) 210-0, 210-1, . . . , 210-m, the virtual memory 230, the virtual disk 240, and the virtual device(s) 270, are shown as being part of the VM 200 for the sake of conceptual simplicity. In actuality, these "components" are usually implemented as software emulations 330 included in the VMM 300. One advantage of such an arrangement is that the VMM 300 may (but need not) be set up to expose "generic" devices, which facilitate VM 200 migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS 220 could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS 220 (in particular, its kernel) is specifically designed to support such an interface. According to this view, having, for example, an off-the-shelf version of Microsoft Windows XP as the guest OS 220 would not be consistent with the notion of para-virtualization. Others define para-virtualization more broadly to include any guest OS 220 with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM 300. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs 300, . . . , 300-*n* on top of a software layer—a kernel 600—constructed specifically to provide efficient support for the VMs 200, . . . , 200-*n*. This configuration is frequently referred to as being "non-hosted." Compared with a system in which VMMs 300, . . . , 300-*n* run directly on the hardware platform, use of a kernel 600 offers greater modularity and facilitates provision of services (for example, resource management) that extend across multiple virtual machines. Compared with a hosted deployment, a kernel 600 may offer greater performance because it can be co-developed with the VMM 300 and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

General Purpose Computing and Security

General-purpose computers are used in countless applications in modern life. Almost irrespective of the specific nature of the application, it is more cost-effective and faster to develop a solution around the general-purpose computer, rather than attempting to build specialized circuitry to accomplish the task. Further, using general-purpose computers allows developers to take advantage of many existing tools, both for product development, and for system administrative tasks. This flexibility is both beneficial and problematic.

In many applications, is not desirable that a user should have completely uninhibited access to the computer. In some situations, such as a public library workstation, the user is only intended to interact with a very limited number of tools, such as the library's electronic card catalog. In such a case, the flexibility and power of the general-purpose computer need to be locked down; the computer becomes essentially a single purpose machine. In other situations, such as an office environment with many identical computers, it may be desirable to have homogenous configurations on every machine. Here, while the user may be allowed to access a variety of tools, his ability to alter the configuration of the general-purpose computer needs to be inhibited.

SUMMARY

Detailed herein are approaches to enabling a secure computing environment. In one approach, a computer system runs an operating system and a virtual machine management console. An input device is used to provide input to the operating system. The operating system is configured such that input received from the input device is directed to the virtual machine management console. The virtual machine management console, in turn, is configured to pass some or all of the input to a virtual machine.

Another approach seeks to make the operating system more secure. A user account is configured for use with a virtual machine, such that logging into the user account causes the virtual machine to begin running. The operating system is configured to disable features and tools unnecessary to the operation of the virtual machine, and to block access to files and programs not necessary for the user account to use the virtual machine.

Some approaches combine elements of the previous approaches, to provide a secure computing environment, under which input can only reach the virtual machine or the virtual machine management software, the operating system has unnecessary features and tools disabled, and the files and programs on the host computer are inaccessible to the user account.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

It is understood that the following embodiments are exemplary in nature. Embodiments of the present invention are well suited to application across a wide range of computers, virtual systems, networks, and storage protocols. Embodiments of the present invention may be used in both posted and non-hosted virtualized computer systems, and regardless of the degree of virtualization and the systems. Embodiments may be used in applications in which the virtual machines have any number of physical and/or logical virtualized processors. Embodiments of the present invention may be implemented in numerous locations, including as part of a computer systems primary operating system, both where the OS is designed to support virtual machines, and where it is not. Additionally, embodiments of the present invention may be implemented in software, in hardware, or in some combination thereof, e.g., in processor architectures intended to provide hardware support for virtual machines.

General Purpose Operating Systems, Computers, and Virtual Machines

Many modern operating systems for general-purpose computers provide at least some functionality by which a user's access to the computer can be limited. Some operating systems incorporate a concept of permissions, where which files or programs a user can access is governed by the permissions associated with that user and the files or programs. Some operating systems incorporate policy modes as well, where certain programs, tools, menu options, and the like can be allowed or disallowed for a particular user. While these tools function to a degree, they are a imperfect fix at best.

Nearly every modern operating system is incredibly complex, and subject to a wide variety of exceptions, manipulations, and exploits, such that the tools cannot be relied upon. For example, these permissions and policies are grafted on top of underlying system tools that, by default, always must run with access to everything, such as drivers; given that, it is unlikely that a perfect implementation of a permissions or policies system will appear in the near future.

Virtual machines offer a partial solution to the problems created by the general-purpose computer. Virtual machines, unlike the host operating system, may be purpose built to a single task, without sacrificing the desired functionality of the general-purpose computer for other tasks. As such, it is more tractable to secure a virtual machine for a single task than to lock down the host operating system. Moreover, given the nature of virtual machines, damage done by software errors or malicious user activity is confined to the virtual machine, rather than the host computer. Additionally, maintaining identical or similar configurations of the virtual machine across multiple computers is very straightforward.

Embodiments of the present invention, as described below, utilize one or more virtual machines, running on a general-purpose computer, to attempt to provide a secure, easily updated operating environment.

In other embodiments, the approach described herein is extended to other applications. In one such embodiment, the underlying approach can be applied to a situation where two separately managed environments are utilized, e.g., a general purpose computer is used to access another computer system, virtual or otherwise. In such an embodiment, a general purpose computer can be configured to restrict access to local tools, files, and programs, while retaining the desired level of access to the remote environment, using methods and systems similar or analogous to those described below.

Exemplary Computer System

Figure 2:
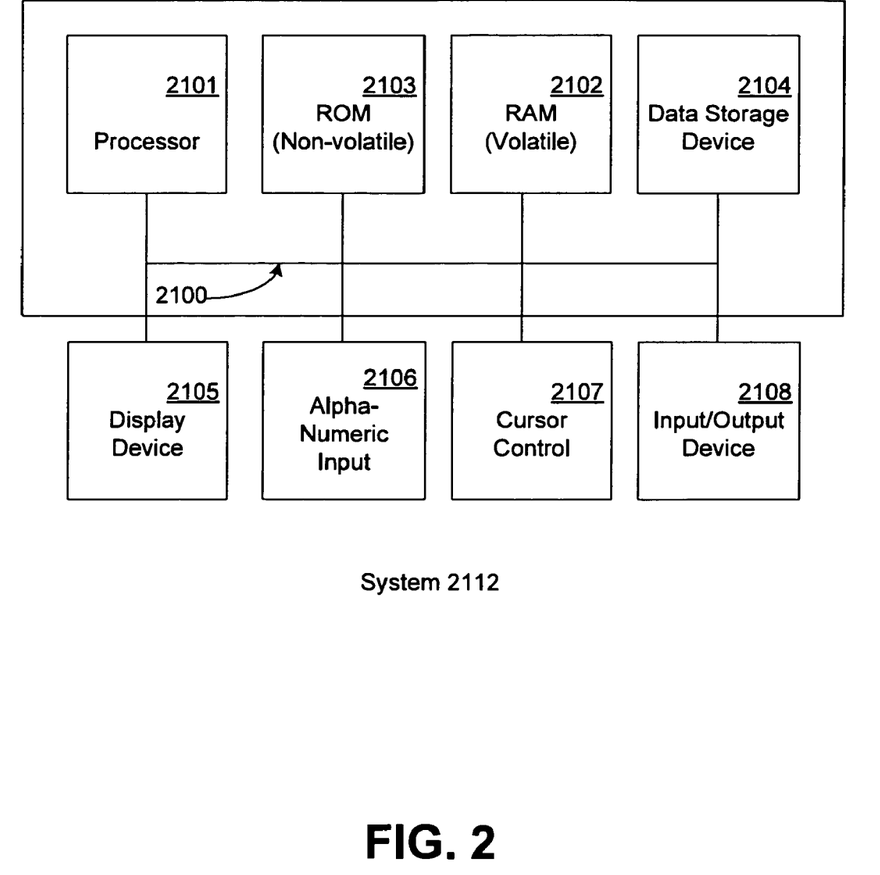
FIG. 2 depicts a block diagram of a computer system, upon which embodiments of the present invention may be implemented.

Referring first to FIG. 2, a block diagram of an exemplary computer system 2112 is shown. It is appreciated that computer system 2112 described herein illustrates an exemplary configuration of an operational platform upon which embodiments of the present invention can be implemented. Nevertheless, other computer systems with differing configurations can also be used in place of computer system 2112 within the scope of the present invention. That is, computer system 2112 can include elements other than those described in conjunction with FIG. 2.

Computer system 2112 includes an address/data bus 2100 for communicating information, a central processor 2101 coupled with bus 2100 for processing information and instructions; a volatile memory unit 2102 (e.g., random access memory [RAM], static RAM, dynamic RAM, etc.) coupled with bus 2100 for storing information and instructions for central processor 2101; and a non-volatile memory unit 2103 (e.g., read only memory [ROM], programmable ROM, flash memory, etc.) coupled with bus 2100 for storing static information and instructions for processor 2101. Computer system 2112 may also contain an optional display device 2105 coupled to bus 2100 for displaying information to the computer user. Moreover, computer system 2112 also includes a data storage device 2104 (e.g., disk drive) for storing information and instructions.

Also included in computer system 2112 is an optional alphanumeric input device 2106. Device 2106 can communicate information and command selections to central processor 2101. Computer system 2112 also includes an optional cursor control or directing device 2107 coupled to bus 2100 for communicating user input information and command selections to central processor 2101. Computer system 2112 also includes signal communication interface (input/output device) 2108, which is also coupled to bus 2100, and can be a serial port. Communication interface 2108 may also include wireless communication mechanisms. Using communication interface 2108, computer system 112 can be communicatively coupled to other computer systems over a communication network such as the Internet, intranet (e.g., a local area network), wireless network, or wireless mesh network.

Providing a Secure Computing Environment

In one embodiment, a general-purpose computer, running a general-purpose operating system, is configured in a manner that allows the computer to be used securely for one or more specified tasks, while retaining the underlying general-purpose nature of the computer and the operating system for ease of administration tasks. Embodiments of the present invention are well suited for use with a wide variety of both computers and operating systems.

Figure 3:
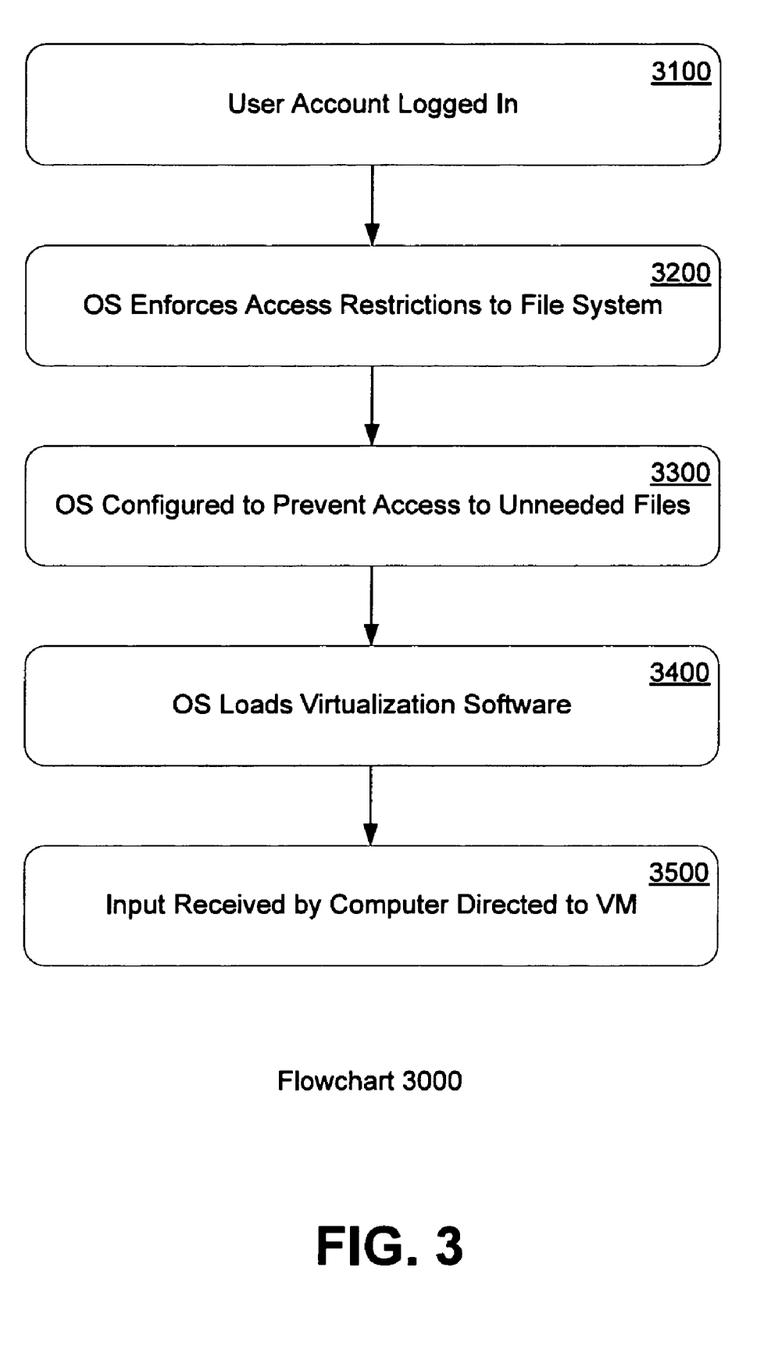
FIG. 3 depicts a flowchart of a method of providing a secure computing environment, in accordance with one embodiment of the present invention.

With reference to FIG. 3, a flowchart 3000 of a method of providing a secure computing environment is depicted, in accordance with one embodiment of the present invention. Although specific steps are disclosed in flowchart 3000, such steps are exemplary. That is, embodiments of the present invention are well suited to performing various other (additional) steps or variations of the steps recited in flowchart 3000. It is appreciated that the steps in flowchart 3000 may be performed in an order different than presented, and that not all of the steps in flowchart 3000 may be performed.

With reference now to step 3100, in some embodiment, a user account for the secure computing environment is selected. In several such embodiments, a user account is created specifically for use with the secure computing environment. As is described in greater detail below, attributes and permissions can be set with respect to this particular user account that aid in securing the computing environment. Also, as described below, the programs and files that are accessed by the operating system when this particular user account is logged in or otherwise authenticated will likely vary from those accessed when a different user account is logged into the same general-purpose computer.

With reference now to step 3200, in some embodiments, the operating system enforces access restrictions to files stored on or available through the computer. In some embodiments, this is accomplished using permissions-based functionality present in the operating system, and related to the user account used for the secure computing environment. In some of these embodiments, the user account can be assigned a permission level such that the user account should not be able to view or alter any files an administrator would wish to protect. In one embodiment, the user account has no permission level that would allow it to a view or alter any file stored on the computer except those that comprise the virtualized environment itself. In other embodiments, access restrictions are enforced in other ways, e.g., policy-based functionality. This step is described in greater detail below, with reference to FIG. 7.

With reference now to step 3300, in some embodiments, the operating system is configured to prevent access to files or programs not needed by the secure computing environment. In some embodiments, the general-purpose operating system ordinarily executes a number of programs on a user logging in. Also, various tools, menus, and functions are normally available to any user of the operating system, which may be undesirable for the secure computing environment. In several such embodiments, the operating system can be configured to inhibit or prevent access to normally available tools and functions, so as to improve the security of the computing environment. This step is described in greater detail below, with reference to FIG. 6.

With reference now to step 3400, in some embodiments, the operating system loads virtualization software. In several such embodiments, the virtualization software then loads one or more virtual machines. In other embodiments, e.g., embodiments where the general-purpose operating system incorporates virtualization support, the operating system loads the virtual machine. In different embodiment, the virtual machine or machines loaded during this step are configured to perform different tasks.

With reference now to step 3500, in some embodiments, input received by the computer is directed to the virtual machine. As explained below, in some embodiments, the methods used to accomplish this operation vary. Additionally, in some embodiments, input received by the computer is directed first to the virtualization software responsible for managing the operation of the virtual machine, and the virtualization software then directs input to virtual machine, as appropriate.

One particular embodiment of the functionality described with reference to steps 3400 and 3500 is described below in greater detail, with reference to FIG. 5.

The method described by flowchart 3000, and systems implement in this method, seek to provide a secure computing environment. In this embodiment, three separate security measures are utilized in conjunction with each other, in order to provide both flexibility and security. First, access restrictions are used to reduce the possibility of accidental or malignant accesses or alteration to data stored on the computer. Second, the operating environment is limited, in that most tools and functions normally available in a general-purpose operating system are disabled, and the ability to extend functionality is disabled. In several such embodiments, where the intent is to provide these tools or functions, they are made available only inside one or more virtual machines. Third, input received by the computer is directed to the virtual machine running, or to the virtualization software controlling the virtual machine. In this embodiment, the net effect of these overlapping protections is such that a user is prevented from directing commands or input at anything but the virtual machine; if that fails, the operating system running behind the virtual machine has been sanitized to ignore a user attempting to access any programs or files; if that fails, the user lacks the permissions necessary to read from or manipulate any file stored on the computer.

Operating Environment

Figure 4:
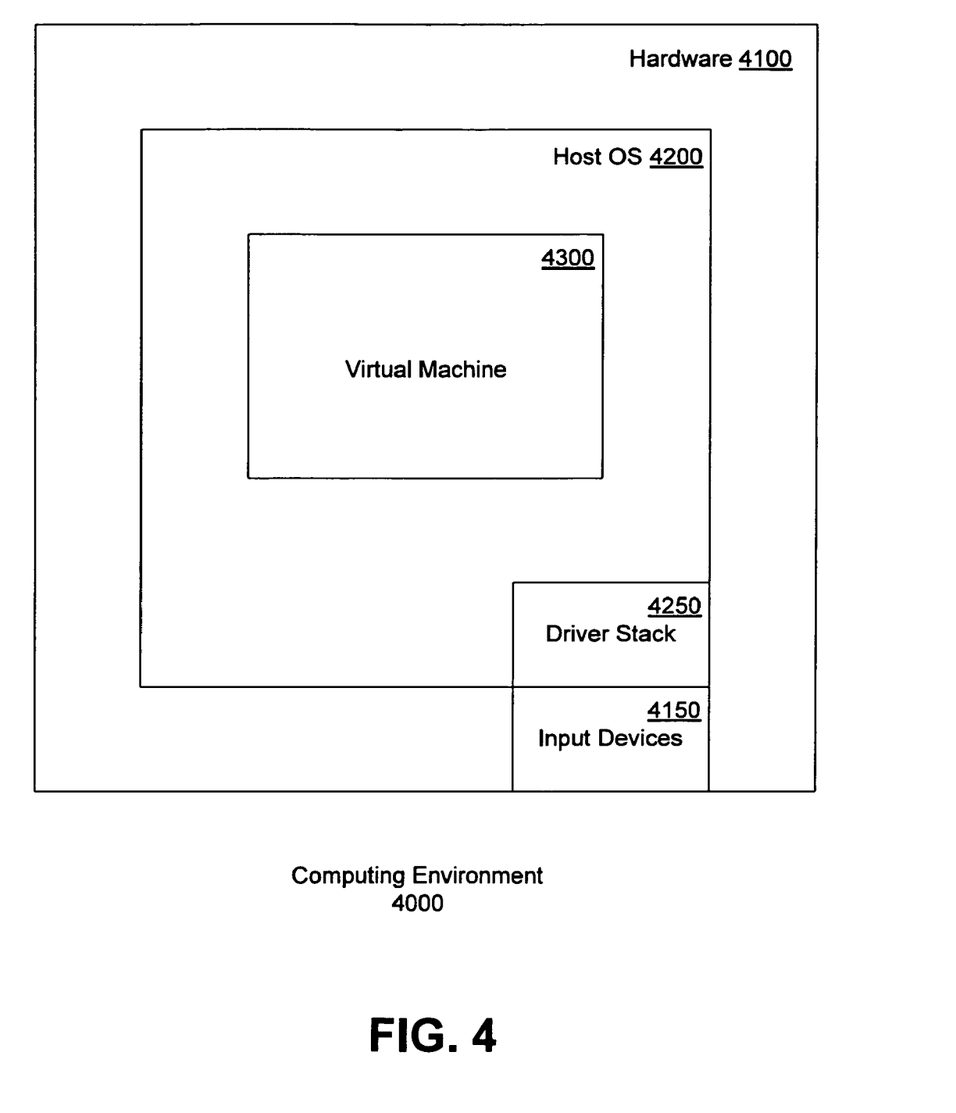
FIG. 4 depicts a block diagram of an operating environment, in accordance with one embodiment of the present invention.

With reference now to FIG. 4, an operating environment 4000 is depicted, in accordance with one embodiment of the present invention. While operating environment 4000 is shown as incorporating specific enumerated features, it is understood that embodiments of the present invention are well suited for use across many different operating environments.

Operating environment 4000 is shown as including the hardware 4100. Hardware 4100, in one embodiment, is a general-purpose computer. In other embodiments, alternative hardware may be utilized, e.g., a computer with limited functionality.

Operating environment 4000 also includes host operating system (OS) 4200. In one embodiment, host OS 4200 is a general-purpose operating system for use on a general-purpose computer, e.g., an operating system for use on a personal computer.

Hardware 4100, as shown, includes input devices 4150. In different embodiment, different input devices 4150 may be utilized. Input devices, in the depicted embodiment, are understood to include, but not limited to, keyboards, mice, network connections, universal serial bus (USB) ports, wireless or radiofrequency communications devices, infrared communications devices, or removable media readers or devices. Input received by operating environment 4000 through one of these input devices 4150, in the depicted embodiment, is largely handled by host OS 4200. As shown, host OS 4200 incorporates driver stack 4250. In the depicted embodiment, driver stack 4250 includes one or more levels of software instructions for receiving, interpreting, and/or manipulating input received from input devices 4150.

Operating environment 4000 is also shown as including virtualization software 4300. Virtualization software 4300, in the depicted embodiment, runs on host OS 4200. In another embodiment, not pictured, host OS 4200 may include virtualization support, such that virtualization software 4300's functionality is incorporated into host OS 4200. In another embodiment, not pictured, virtualization software 4300 may incorporate simple operating system functionality, so as to obviate the need for host OS 4200. In other embodiments, other levels of interrelation or interaction between host OS 4200 and virtualization software 4300 may occur.

Operating environment 4000 is depicted as incorporating one or more virtual machines (VM) 4400. In the depicted embodiment, VM 4400 operates on virtualization software 4300.

"Trapping" Input

In some embodiments of the present invention, one approach to providing a secure computing environment is to prevent input from reaching any portion of the operating environment other than the desired target. In one such embodiment, for example, if all input received by the computer is directed solely to a secure virtual machine, only the virtual machine is exposed to accidental or malignant input. In different embodiments, it may be desirable to have different levels of the operating environment exposed. For example, in one embodiment, only a single virtual machine needs to be available to a user, while in another, multiple secure virtual machines should be available to the user, while in the third, a privileged user or administrator may need to direct input to the virtualization software controlling virtual machines, or possibly to the host operating system. The approach described herein is applicable to each of these enumerated cases, as well as to other embodiments not listed.

Figure 5:
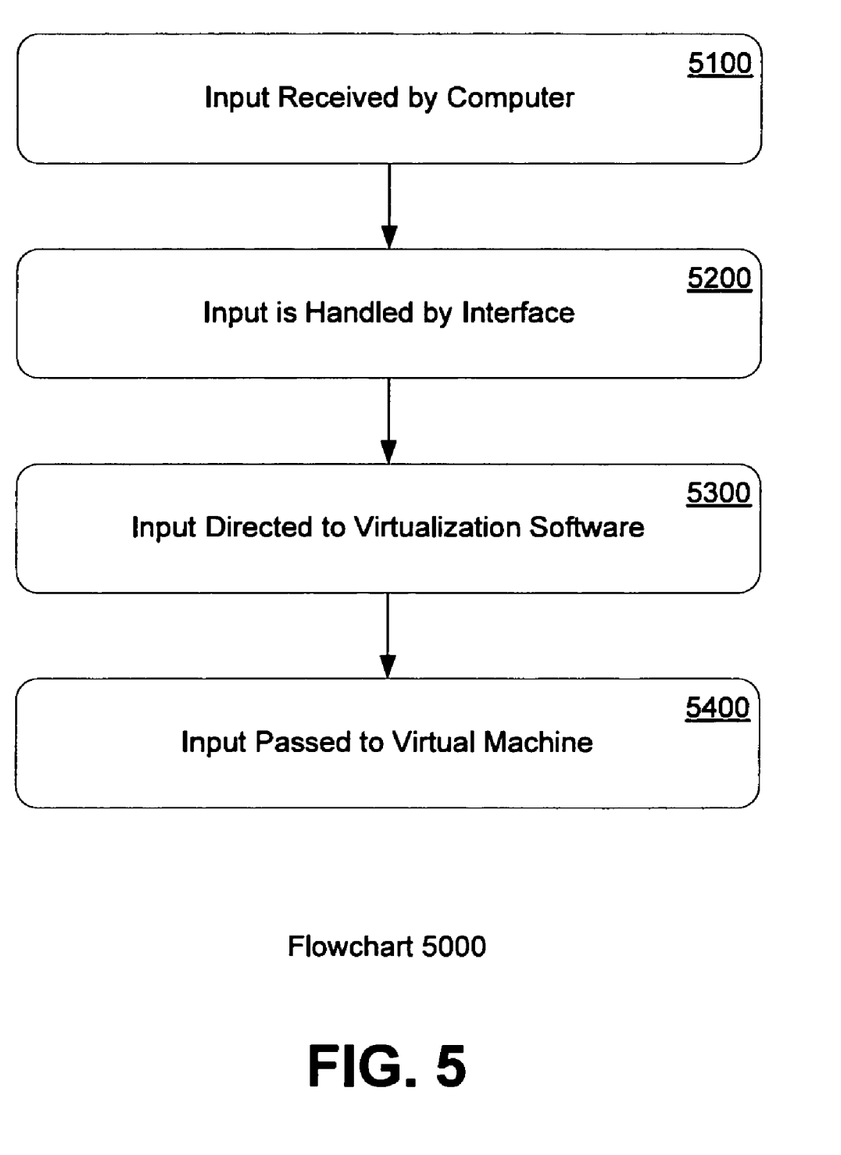
FIG. 5 depicts a flowchart of a method of directing input to a computer, in accordance with one embodiment of the present invention.

With reference now to FIG. 5, a flowchart 5000 of a method of directing input to a computer is shown, in accordance with one embodiment of the present invention. Although specific steps are disclosed in flowchart 5000, such steps are exemplary. That is, embodiments of the present invention are well suited to performing various other (additional) steps or variations of the steps recited in flowchart 5000. It is appreciated that the steps in flowchart 5000 may be performed in an order different than presented, and that not all of the steps in flowchart 5000 may be performed.

With reference now to step 5100, input is received into the computer from an input source. In different embodiments, the nature of this input may vary. For example, and not by way of limitation, input may be received via a keyboard interface, a computer mouse, or insertion of a CD-ROM into a CD-ROM drive.

With reference now to step 5200, the input is handled by an interface mechanism. In some embodiments, input thus received is handled by an input interface. The nature of the input interface may vary across different embodiments as well, e.g., different drivers within the operating system on computer handle different types of input, or the computer's BIOS may handle some portion or certain types of input.

With reference now to step 5300, the input is directed to virtualization software running on the computer. As is described in greater detail below, the actions used to direct the input from the interface mechanism to the virtualization software may vary across different embodiments, or by the nature of the input. Further, in some embodiments, the action taken by the interface or by the virtualization software may depend upon the nature the input; in one embodiment, certain input mechanisms are simply disabled at the interface mechanism level, with the net effect of preventing the input from being received into the computer, or of preventing the input from being interpreted or handled by any portion of the operating environment.

With reference now to step 5400, the virtualization software passes some or all of the input to one or more virtual machines running on the computer. In some embodiments, the virtualization software serves both as a translator, to render the input into a form the virtual machine understands, and as a gatekeeper, to prevent undesired input from reaching the virtual machine. In another embodiment, the virtualization software also watches for command input or an instruction code, designed to instruct the virtualization software to carry out a task, e.g., an authorized administrator instructing the virtualization software to shut down, or to change operating modes, e.g., to switch between virtual machines, or to allow the user greater access to functionality in the VM or the virtualization software. In other embodiments, the virtualization software performs additional, fewer, or different tasks, as appropriate.

The method laid out in flowchart 5000 will vary somewhat, across different embodiments. In one embodiment, where an administrative user is intended to be able to control the virtualization software while it is running, not all input should be passed directly to the virtual machine; rather, the virtualization software needs to be able to receive input as well, e.g., an escape or command code, which could result in a prompting for an administrative password. In another embodiment, where multiple virtual machines are intended to be available within the secure computing environment, some mechanism needs to be in place to allow focus to shift from one virtual machine to another, e.g., some command needs to be received by the virtualization software, instructing it to change focus to another virtual machine. In some embodiments, exceptions such as those noted above, as well as others not enumerated, can be handled by the virtual machine, e.g., providing input to the virtual machine causes it to notify the virtualization software, rather than allowing the user to send a command or request directly to the virtualization software.

Input Redirection

In some embodiments, only input events which would allow a user to access some program other than the virtual machine, or in some cases the virtualization software, are of concern. These types of input "events" can be classified as being either explicit or implicit. Explicit events involve the user attempting to exit the virtual machine using the functionality of the virtual machine, e.g., telling the virtual machine to shut down. These events can be addressed by configuring the virtual machine to disallow this functionality, or in the case of multiple virtual machines running simultaneously, limiting the functionality appropriately.

Implicit events, on the other hand, involve performing some action that allows the user access to the operating system or another program, without interacting with the virtual machine. Many different such actions exist, depending upon the host operating system in use, and the difficulty of redirecting such input varies with the operating system, and the type of input in question. For example, under the Windows® operating system (Microsoft Corporation), key combinations such as ctrl+alt+del, Windows+U, and ctrl-shift-esc are written into the operating system at a low level, which makes them more difficult to intercept. In some embodiments, the underlying keyboard driver is replaced; the replacement driver can be configured to pass these calls to the virtualization software or the VM, rather than the host OS. In other embodiments, the portion of the underlying host OS which handles these calls may be configured or replaced, e.g., for the Windows® operating system, the Microsoft Graphical Identification and Authentication dynamic link library can be modified or replaced.

Many different approaches to input redirection are viable for use with embodiments of present invention.

A related problem, in some embodiments, is the use of the host OS's application programming interfaces (APIs) within the VM or the virtualization software. In particular, many API calls are performed at a elevated permission level, and thus have the potential to provide unintentional access to files or programs on the computer. In some embodiments, the VM and virtualization software do not make use of the host OS's APIs, e.g., for drawing buttons or windows within the graphical user interface (GUI); in several such embodiments, any use of these elements must be built into the NW itself. In other embodiments, invocations of such elements are intentionally kept limited, to reduce the potential exposure. In other embodiments, other approaches are utilized.

"Locking Down" the Host Computer

In some embodiments of the present invention, one approach to providing a secure operating environment is to "lockdown" the host operating system, such that no vulnerable programs are running or accessible while the secure virtual machines running.

Figure 6:
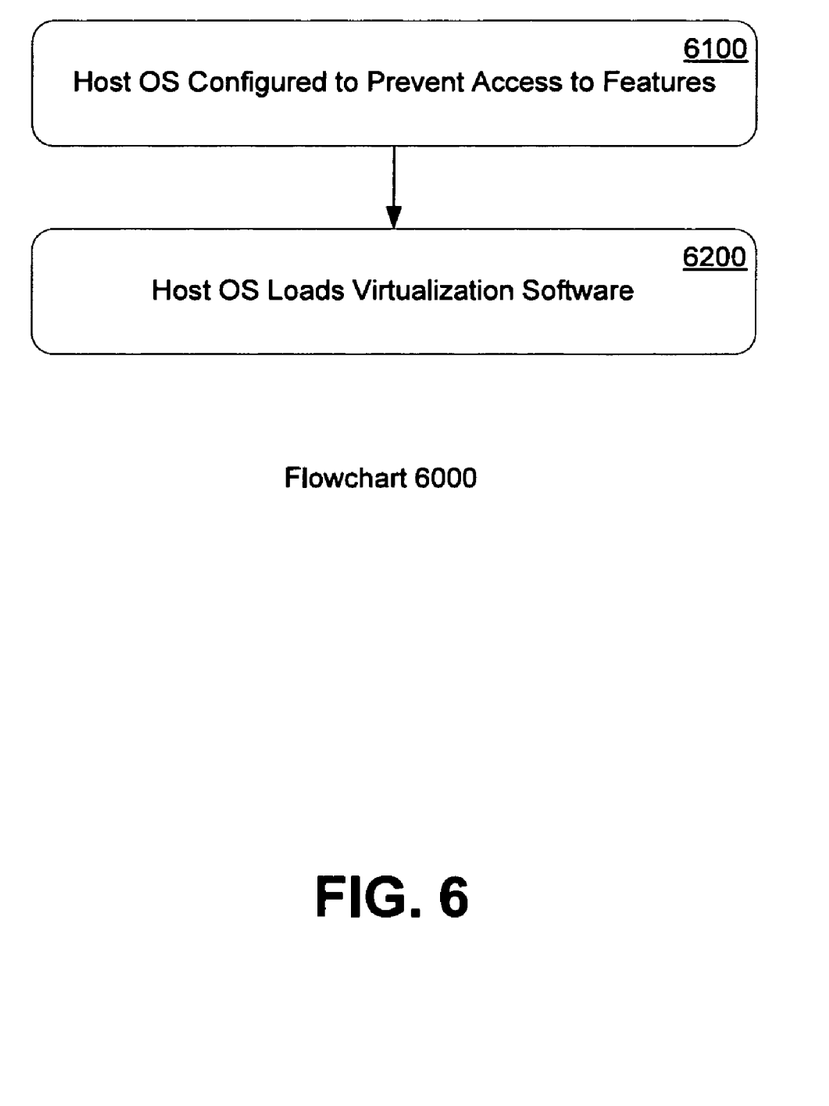
FIG. 6 depicts a method of securing an operating environment, in accordance with one embodiment of the present invention.

With reference now to FIG. 6, a flowchart 6000 of a method of securing an operating environment is depicted, in accordance with one embodiment of the present invention. Although specific steps are disclosed in flowchart 6000, such steps are exemplary. That is, embodiments of the present invention are well suited to performing various other (additional) steps or variations of the steps recited in flowchart 6000. It is appreciated that the steps in flowchart 6000 may be performed in an order different than presented, and that not all of the steps in flowchart 6000 may be performed.

With reference now to step 6100, a host operating system on a computer is configured to prevent access to selected operating system tools. As is explained in greater detail below, many general-purpose operating systems incorporate a wide selection of tools, programs, features, and menus that are generally available to users, including the ability to extend functionality by installing or invoking additional software. In some embodiments, the operating system can be configured to block access to these features. In one such embodiment, a user account can be created and set aside for use as a secure operating environment for running a virtual machine; this account can be configured in this manner, to prevent or inhibit access to selected features and programs within the operating system.

With reference now to step 6200, the host operating system loads virtualization software. In some embodiments, where the host operating system allows multiple user accounts, and one user account has been set aside for use as a secure operating environment, the host operating system can be configured to launch the virtualization software when the user logs in. In other embodiments, the virtualization software is loaded in other ways. In some embodiments, e.g., where the host OS supports virtualization natively, the host OS may launch one or more virtual machines in addition to, or in place of, the virtualization software. In other embodiments, the virtualization software, after loading, launches one or more virtual machines.

In some embodiments, step 6100 encompasses at least two distinct tasks. First, the host operating system can be configured to prevent programs not related to the virtualization software from executing on startup. For example, under the Windows® operating system, explorer.exe normally executes upon logging in under any user account. This program is necessary to browse the computer's file structure, as well as to execute other programs. By preventing it from running, many potential security risks are averted, e.g., those programs and actions that rely upon explorer.exe are similarly inhibited from running. In other embodiments, such as those operating under different host operating systems, similar or analogous programs exist. Moreover, programs unrelated to the operation of the virtualization software can be prevented from executing as well, e.g., if the virtual machine to be run does not require sound, programs and drivers for initializing a sound card in the computer can be skipped.

The second task within step 6100 is to configure the host OS to disable features within the operating system which present a security risk. This includes, but is not limited to, tools, keystroke combinations, menu items, and help items which are normally present under operation of the host OS, but which may allow a user to access some portion of the host computer, rather than the virtual machine (s) he or she is intended to be locked into. For example, open/save dialogs in many operating systems allow the entire file structure of the host computer to be viewed, and sometimes even allows other programs to be executed.

Many different approaches can be taken to configuring the host OS to accomplish these two tasks. In some embodiments, editing the registry for the host OS and/or setting policies for one or more user accounts on the host computer can be utilized.

A number of features, functions, and tools that should be so configured is presented. It is understood that this list is non-exhaustive and exemplary in nature; in different embodiments, additional, fewer, or different elements of the host OS and related software may be configured in different manners. In some embodiments, AutoRun functionality upon insertion of some removable media device, e.g., a CD-ROM or USB storage device, should be disabled; this can be accomplished via a group policy or a registry entry. In some embodiments, a listing of the currently executing processes on the computer should be made unavailable to the user, e.g., Task Manager, which includes a menu option to launch a new process. In some embodiments, open/save dialogs should be made more secure, e.g., by blocking access to right-click context menus, or disabled. In some embodiments, certain key combinations can be disabled via policy settings or registry entries. In some embodiments, the ability to add or remove hardware, e.g., printers, should be disabled. In some embodiments, the ability to map, a map, or access network drives available to the host computer should be disabled; in several embodiments, all network access should be disabled. In some embodiments, options within Web browsers should be disabled, or the Web browsers themselves disabled, as appropriate.

In some embodiments, the host operating system is configured to launch virtualization software. In several such embodiments, this is performed as soon as a specified user account logs in, e.g., a user account set aside specifically for use as a secure computing environment. In some embodiments, is possible to configure the host operating system such that the virtualization software is the shell for the operating system; in several of these embodiments, the virtualization software replaces the shell for the host OS, and the usual shell does not execute. In other embodiments, the virtualization software is launched in other ways. In some embodiments, the host OS incorporates virtualization functionality, rather than needing to launch separate virtualization software.

User Based Permissions

In some embodiments, one approach to providing a secure computing environment is to utilize access permissions incorporated into the host operating system for a computer. In some such embodiments, a user account is set aside for use with a secure computing environment; this user account can be assigned permissions sufficient to allow it to run the virtualization software and virtual machine(s), while still denying it permission to interact with other files or programs stored on the host computer.

Figure 7:
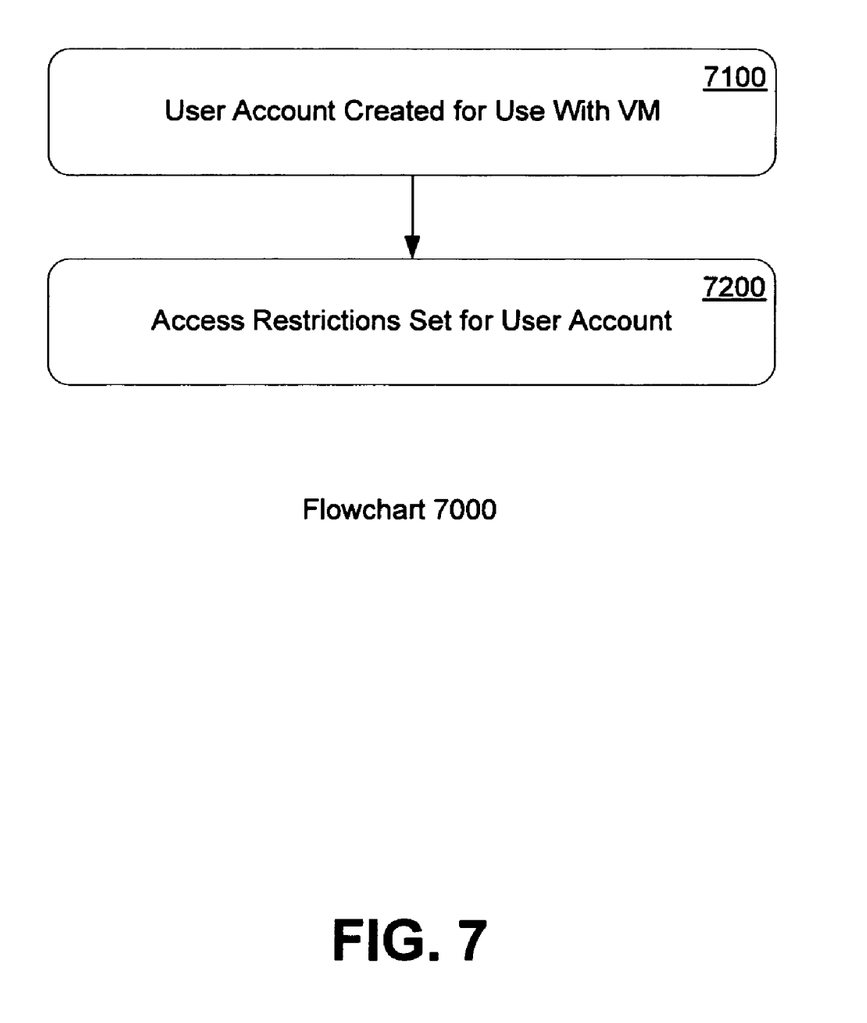
FIG. 7 depicts a method of preventing access to files and programs, in accordance with one embodiment of the present invention.

With reference now to FIG. 7, a flowchart 7000 of a method of preventing access to files and programs is presented, in accordance with one embodiment of the present invention. Although specific steps are disclosed in flowchart 7000, such steps are exemplary. That is, embodiments of the present invention are well suited to performing various other (additional) steps or variations of the steps recited in flowchart 7000. It is appreciated that the steps in flowchart 7000 may be performed in an order different than presented, and that not all of the steps in flowchart 7000 may be performed.

With reference now to step 7100, a user account is created for use with a secure computing environment. In some embodiments, this user account will only be used in conjunction with one or more virtual machines.

With reference now to step 7200, access restrictions are set for the user account. In some embodiments, access restrictions are sent such that the user account is not authorized to access any programs or files other than those necessary to run the virtualization software and the associated virtual machines.

While the permissions and access restriction systems present in many operating systems are not, in themselves, sufficient to prevent unauthorized access to data and programs stored on those computers, some embodiments incorporate these existing tools into a secure computing environment. In conjunction with a virtual computing environment, these features can be useful.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    logging in, by a computer system, a user account of a host operating system (OS) running on the computer system, wherein the user account is associated with a secure computing environment; and
    upon logging in the user account, providing, by the computer system, the secure computing environment by:
        preventing, based on a configuration of the user account, execution of one or more selected programs by the host OS that are unrelated to virtualization software running on the computer system;
        disabling, based on the configuration of the user account, one or more selected user interface features of the host OS that allow access to files or programs resident on the computer system;
        automatically launching a first virtual machine via the virtualization software; and
        redirecting input received from a user of the user account to the virtualization software, wherein the virtualization software is configured to pass a portion of the input to the first virtual machine, and wherein the redirecting causes the input to be directed solely to the virtualization software, such that the input is not acted upon by programs of the host OS or the host OS itself for any purpose other than performing the redirecting.

2. The method of claim 1, wherein said redirecting comprises:
    receiving said input via an interface driver;
    passing said input from said interface driver to said virtualization software.

3. The method of claim 2, further comprising:
    passing said input from said virtualization software to said first virtual machine.

4. The method of claim 2, further comprising:
    monitoring said input for an instruction code, said instruction code for instructing said virtualization software to change from a first mode of operation to a second mode of operation.

5. The method of claim 4, wherein said virtualization software is operable in said second mode to run a second virtual machine.

6. The method of claim 5, wherein said instruction code is received from an authenticated user.

7. The method of claim 1, wherein said input comprises keyboard input.

8. The method of claim 1, wherein said input comprises network input.

9. The method of claim 1 wherein the one or programs include a native shell program for the host OS.

10. The method of claim 1 wherein the one or more user interface features include open/save dialogs, keystroke combinations, or menu items of the host OS that allow access to files or programs resident on the computer system.

11. The method of claim 1 wherein the user account is associated with access restrictions that prevent the user from reading, writing, or executing files accessible on the computer system through the host OS.

12. The method of claim 1 wherein the first virtual machine is configured to disallow the user from exiting from the first virtual machine.

13. A computer system comprising:
    a processor configured to:
        log in a user account of a host operating system (OS) running on the computer system, the user account being associated with a secure computing environment; and
        upon logging in the user account, provide the secure computing environment by:
            preventing, based on a configuration of the user account, execution of one or more selected programs by the host OS that are unrelated to virtualization software running on the computer system;
            disabling, based on the configuration of the user account, one or more selected user interface features of the host OS that allow access to files or programs resident on the computer system;
            automatically launching a first virtual machine via the virtualization software; and
            redirecting input received from a user of the user account to the virtualization software, wherein the virtualization software is configured to pass a portion of the input to the first virtual machine, and wherein the redirecting causes the input to be directed solely to the virtualization software, such that the input is not acted upon by programs of the host OS or the host OS itself for any purpose other than performing the redirecting.

14. The computing system of claim 13, wherein the host OS comprises a driver, said driver for enabling an input device.

15. The computing system of claim 14, wherein said driver is configured to pass a command, received from an input device, to said virtualization software.

16. The computing system of claim 13, wherein said virtualization software is configured to detect an instruction code contained in said input, and, in response to said instruction code, change from a first mode of operation to a second mode of operation.

17. The secure computing system of claim 13, wherein the processor is further configured to create and manage a second virtual machine via the virtualization software, and wherein the virtualization software is further configured to pass a second portion of said input to said second virtual machine.

18. A non-transitory computer readable medium having stored thereon computer-readable program code executable by a computer system, the program code comprising:
    code that causes the computer system to log in a user account of a host operating system (OS) running on the computer system, the user account being associated with a secure computing environment; and
    code that causes the computer system to provide the secure computing environment upon logging in the user account, the code that causes the computer system to provide the secure computing environment comprising:

code that causes the computer system to prevent, based on a configuration of the user account, execution of one or more selected programs by the host OS that are unrelated to virtualization software running on the computer system;

code that causes the computer system to disable, based on the configuration of the user account, one or more selected user interface features of the host OS that allow access to files or programs resident on the computer system;

code that causes the computer system to automatically launch a first virtual machine via the virtualization software; and code that causes the computer system to redirect input received from a user of the user account to the virtualization software, wherein the virtualization software is configured to pass a portion of the input to the first virtual machine, and wherein the redirecting causes the input to be directed solely to the virtualization software, such that the input is not acted upon by programs of the host OS or the host OS itself for any purpose other than performing the redirecting.

19. The non-transitory computer readable medium of claim 18, wherein an administrative user account is provided, said administrative account being configured for administering operation of said computer system, said host OS, and said virtualization software.

* * * * *